US012610254B2

(12) United States Patent
Bala et al.

(10) Patent No.: US 12,610,254 B2
(45) Date of Patent: Apr. 21, 2026

(54) APPARATUS AND METHOD FOR MOBILITY WITH AI/ML CHANNEL PREDICTION

(71) Applicants:RAKUTEN MOBILE, INC., Tokyo (JP); Rakuten Symphony, Inc., Tokyo (JP)

(72) Inventors: Erdem Bala, San Mateo, CA (US); Koichiro Kitagawa, Tokyo (JP)

(73) Assignees: RAKUTEN MOBILE, INC., Tokyo (JP); RAKUTEN SYMPHONY, INC., Tokyo (JP)

( * ) Notice: Subject to any disclaimer, the term of this patent is extended or adjusted under 35 U.S.C. 154(b) by 416 days.

(21) Appl. No.: 18/021,417

(22) PCT Filed: Jan. 18, 2023

(86) PCT No.: PCT/US2023/011001
§ 371 (c)(1),
(2) Date: Feb. 15, 2023

(87) PCT Pub. No.: WO2024/096920
PCT Pub. Date: May 10, 2024

(65) Prior Publication Data
US 2024/0276239 A1 Aug. 15, 2024

Related U.S. Application Data

(60) Provisional application No. 63/423,668, filed on Nov. 8, 2022, provisional application No. 63/421,731, filed on Nov. 2, 2022.

(51) Int. Cl.
H04W 24/02 (2009.01)
H04B 17/318 (2015.01)
H04B 17/336 (2015.01)

(52) U.S. Cl.
CPC .......... H04W 24/02 (2013.01); H04B 17/328 (2023.05); H04B 17/336 (2015.01)

(58) Field of Classification Search
CPC .. H04W 24/02; H04W 36/008; H04B 17/328; H04B 17/336; G06N 20/00
See application file for complete search history.

(56) References Cited

U.S. PATENT DOCUMENTS

2011/0013592 A1* 1/2011 Uemura ............ H04W 36/0061
370/331
2014/0003257 A1 1/2014 Chin et al.
(Continued)

FOREIGN PATENT DOCUMENTS

WO WO-2021118418 A1 * 6/2021 .... H04W 36/008375

OTHER PUBLICATIONS

International Search Report dated May 1, 2023 in Application No. PCT/US23/11001.
(Continued)

*Primary Examiner* — Charles C Jiang
*Assistant Examiner* — Ryan C Kavleski
(74) *Attorney, Agent, or Firm* — Sughrue Mion, PLLC

(57) ABSTRACT

A method performed by at least one processor of a user equipment (UE) having a connection with a serving cell in a wireless communication network includes receiving, from a target cell in the wireless communication network, a set of resources for a slot n. The method includes measuring, for the target cell, a network quality parameter based on the set of resources. The method includes reporting, to the serving cell, results corresponding to the measuring of the network quality parameter. The method includes receiving, based on (i) a prediction from an artificial intelligence machine learning (AI/ML) model using the measuring of the network quality parameter as an input into the AI/ML model and (ii)
(Continued)

500

Start

S502 Receive, from a target cell in a wireless communication network, a set of resources for a slot n S504 Measure, for the target cell, a network quality parameter based on the set of resources S506 Report, to the serving cell, results corresponding to the measuring of the network quality parameter S508 Receive, based on (i) a prediction from an AI/ML model using the measuring of the network quality parameter as an input into the AI/ML model and (ii) a determination that a cell switching condition is satisfied, a command to switch from the serving cell to the target cell at a time corresponding to slot n+k End a determination that a cell switching condition is satisfied, a command to switch from the serving cell to the target cell at a time corresponding to slot n+k.

18 Claims, 5 Drawing Sheets

(56)             References Cited

U.S. PATENT DOCUMENTS

| | | | |
|---|---|---|---|
| 2016/0183192 | A1 | 6/2016 | Kang et al. |
| 2021/0112466 | A1 | 4/2021 | Susitaival et al. |
| 2022/0014963 | A1* | 1/2022 | Yeh ......................... G06N 3/045 |
| 2023/0115368 | A1* | 4/2023 | Parichehrehteroujeni ................... H04W 12/60 706/46 |
| 2023/0388817 | A1* | 11/2023 | Rydén ................... H04W 24/02 |
| 2023/0403606 | A1* | 12/2023 | Lunardi ................ H04W 24/02 |
| 2025/0048140 | A1* | 2/2025 | Wang ..................... H04W 24/02 |
| 2025/0175836 | A1* | 5/2025 | Li ......................... H04L 5/0057 |

OTHER PUBLICATIONS

Written Opinion of the International Searching Authority dated May 1, 2023 in Application No. PCT/US23/11001.
"AI-assisted Target Cell Prediction for Inter-cell Beam Management", Media Tek Inc., 3GPP Tsg-Ran WG1 Meeting #109 R1-2205102, e-Meeting May 9-20, 2022, (4 pages).

* cited by examiner

400

Cell-3

408

402    Cell-1

404

406

Cell-2

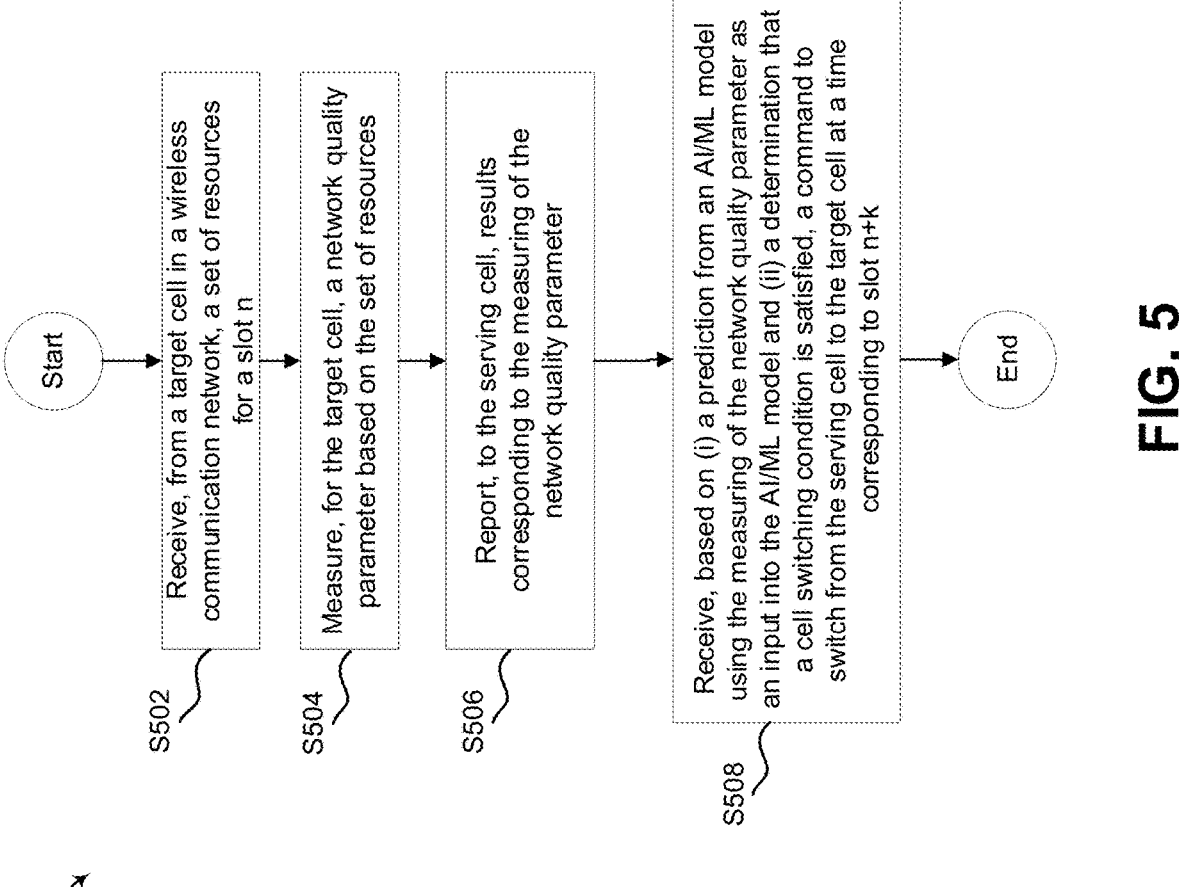

500

Start

S502 — Receive, from a target cell in a wireless communication network, a set of resources for a slot n S504 — Measure, for the target cell, a network quality parameter based on the set of resources S506 — Report, to the serving cell, results corresponding to the measuring of the network quality parameter S508 — Receive, based on (i) a prediction from an AI/ML model using the measuring of the network quality parameter as an input into the AI/ML model and (ii) a determination that a cell switching condition is satisfied, a command to switch from the serving cell to the target cell at a time corresponding to slot n+k End

FIG. 5

APPARATUS AND METHOD FOR MOBILITY WITH AI/ML CHANNEL PREDICTION

CROSS-REFERENCE TO RELATED APPLICATIONS

This application is a National Stage of International Application No. PCT/US2023/011001, filed on Jan. 18, 2023, which claims priority based on U.S. Provisional Patent Application No. 63/423,668, filed on Nov. 8, 2022, and claims priority based on U.S. Provisional Patent Application No. 63/421,731, filed on Nov. 2, 2022, the disclosure of which is incorporated herein by reference in its entirety.

FIELD

Apparatuses and methods consistent with example embodiments of the present disclosure relate to reducing mobility latency in a Radio Access Network (RAN) using an artificial intelligence/machine learning (AI/ML) model based channel prediction.

BACKGROUND

Currently, a 3GPP framework for an AI/ML model for an air-interface corresponding to each target use case regarding aspects such as performance, complexity, and potential specification impact is being explored. Some of these use cases focus on channel state information (CSI) feedback enhancement (e.g., overhead reduction, improved accuracy, prediction), beam management (e.g., beam prediction in time, and/or spatial domain for overhead and latency reduction, beam selection accuracy improvement), and positioning accuracy enhancements for different scenarios including, for example, those with heavy non-line-of-sight (NLOS) conditions.

These uses cases may be categorized into sub use cases for characterization and baseline performance evaluations. The AI/ML model approaches for the selected sub use cases should be diverse enough to support various requirements on the gNB-UE collaboration levels. The selection of use cases may target the formulation of a framework to apply an AI/ML model to the air-interface for these and other use cases.

An AI/ML model, terminology, and description are developed to identify common and specific characteristics for framework investigations including characterizing the defining stages of AI/ML model related algorithms and associated complexity. These stages include, for example, model generation (e.g., model training (including input/output, pre-/post-process, online/offline as applicable), model validation, model testing, as applicable) and inference operation (e.g., input/output, pre-/post-process, as applicable).

Framework investigations may identify various levels of collaboration between UE and gNB pertinent to the selected use cases including, for example: (1) No collaboration: implementation-based only AI/ML model algorithms without information exchange for comparison purposes, and (2) Various levels of UE/gNB collaboration targeting at separate or joint ML operation. Framework investigations may further characterize lifecycle management of an AI/ML model (e.g., model training, model deployment, model inference, model monitoring, model updating).

Framework investigations may utilize dataset(s) for training, validation, testing, and inference; and identify common notation and terminology for AI/ML model related functions, procedures, and interfaces.

In 5G NR connected mode mobility, the UE periodically assesses the link quality of the serving cell and the neighbor cells. To assess the link quality, the UE performs measurements. These measurements may contain a reference signal received power (RSRP) and/or a reference signal received quality (RSRQ) of the synchronization signal blocks (SSBs) of the serving and neighbor cells. The measurements may be processed by L3 filtering and reported to the serving cell based on a reporting configuration. If one of the neighbor cells meets cell switching (e.g., handover) criteria, the serving cell indicates to the UE to handover to the neighbor cell. After cell switching, the UE may perform random access in the new cell.

5G NR has also introduced beam level mobility. Beam Level Mobility may not require explicit radio resource control (RRC) signalling to be triggered. Beam level mobility may be within a cell, or between cells (e.g., inter-cell beam management (ICBM)). For ICBM, a UE may receive or transmit UE dedicated channels/signals via a total radiated power (TRP) associated with a PCI different from the PCI of a serving cell, while non-UE-dedicated channels/signals may only be received via a TRP associated with a physical cell ID (PCI) of the serving cell. The gNB provides, via RRC signalling, the UE with measurement configuration containing configurations of SSB/CSI resources and resource sets, reports and trigger states for triggering channel and interference measurements and reports. For ICBM, a measurement configuration may include SSB resources associated with PCIs different from the PCI of a serving cell. Beam Level Mobility may be handled at lower layers by means of physical layer and media access control (MAC) layer control signalling. The RRC, hosted at the control unit-control plane (CU-CP), may not be required to know which beam is being used by the UE at a given point in time.

SSB-based Beam Level Mobility is based on the SSB associated to the initial downlink (DL) bandwidth part (BWP) and can only be configured for the initial DL BWPs and for DL BWPs containing the SSB associated to the initial DL BWP. For other DL BWPs, Beam Level Mobility may only be performed based on channel state information reference signal (CSI-RS) resources.

To further enhance beam level mobility, mechanisms and procedures of L1/L2 based inter-cell mobility for mobility latency reduction are being specified. However, current mechanisms and procedures do not adequately handle mobility latency reduction.

SUMMARY

According to embodiments, systems and methods are provided for implementing mechanisms for reducing mobility (e.g., handover) latency using an AI/ML model based channel prediction.

According to an exemplary embodiment, a method performed by at least one processor of a user equipment (UE) having a connection with a serving cell in a wireless communication network includes receiving, from a target cell in the wireless communication network, a set of resources for a slot n. The method includes measuring, for the target cell, a network quality parameter based on the set of resources. The method includes reporting, to the serving cell, results corresponding to the measuring of the network quality parameter. The method includes receiving, based on (i) a prediction from an artificial intelligence machine learning (AI/ML) model using the measuring of the network quality parameter as an input into the AI/ML model and (ii) a determination that a cell switching condition is satisfied, a command to switch from the serving cell to the target cell at a time corresponding to slot n+k. The parameters n and k are integers greater than zero.

According to an exemplary embodiment, a user equipment (UE) having a connection with a serving cell in a wireless communication network includes at least one memory configured to store computer program code, and at least one processor configured to access said at least one memory and operate as instructed by the computer program code. The computer program code includes first receiving code configured to cause at least one of said at least one processor to receive, from a target cell in the wireless communication network, a set of resources for a slot n. The computer program code further includes measuring code configured to cause at least one of said at least one processor to measure, for the target cell, a network quality parameter based on the set of resources. The computer program code further includes reporting code configured to cause at least one of said at least one processor to report, to the serving cell, results corresponding to the measuring of the network quality parameter. The computer program code further includes second receiving code configured to cause at least one of said at least one processor to receive, based on (i) a prediction from an artificial intelligence machine learning (AI/ML) model using the measuring of the network quality parameter as an input into the AI/ML model and (ii) a determination that a cell switching condition is satisfied, a command to switch from the serving cell to the target cell at a time corresponding to slot n+k. The parameters n and k are integers greater than zero.

According to an exemplary embodiment, a non-transitory computer readable medium having instructions stored therein, which when executed by a processor in a user equipment (UE) having a connection with a serving cell in a wireless communication network, cause the processor to execute a method including receiving, from a target cell in the wireless communication network, a set of resources for a slot n. The method includes measuring, for the target cell, a network quality parameter based on the set of resources. The method includes reporting, to the serving cell, results corresponding to the measuring of the network quality parameter. The method includes receiving, based on (i) a prediction from an artificial intelligence machine learning (AI/ML) model using the measuring of the network quality parameter as an input into the AI/ML model and (ii) a determination that a cell switching condition is satisfied, a command to switch from the serving cell to the target cell at a time corresponding to slot n+k. The parameters n and k are integers greater than zero.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 5 illustrates a flow chart of an embodiment of performing an AI/ML model based cell switching process, in accordance with various embodiments of the present disclosure.

DETAILED DESCRIPTION

Figure 1:
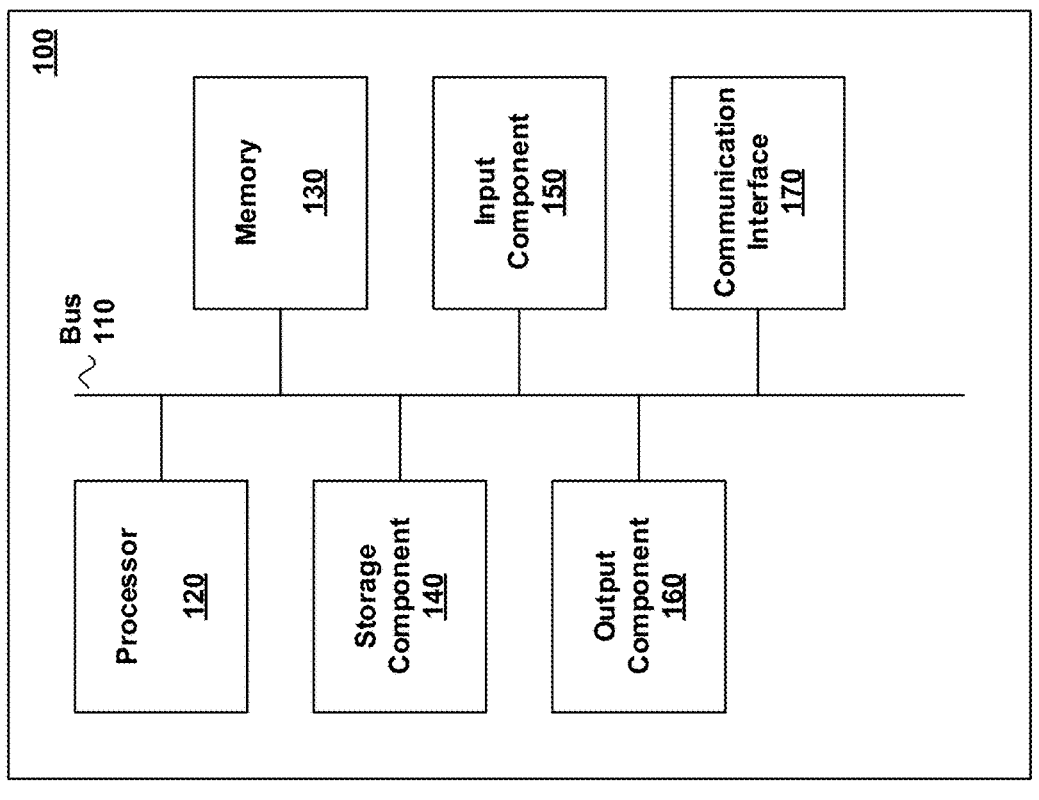
FIG. 1 is a diagram of an example network device, in accordance with various embodiments of the present disclosure.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Embodiments of the present disclosure are directed toward reducing the high latency of mobility mechanisms via an AI/ML model based channel prediction. While new L1/L2 based mobility will specify mechanisms to reduce the latency, this latency may be further reduced via an AI/ML model based channel prediction. The AI/ML model based channel prediction may be performed by the UE, or at the network side (e.g., base station). Based on the prediction, the UE may perform the required configuration and synchronizations prior to the UE switching from a serving cell to a target cell, thereby reducing latency.

FIG. 1 is diagram of an example device for performing translation services. Device 100 may correspond to any type of known computer, server, or data processing device. For example, the device 100 may comprise a processor, a personal computer (PC), a printed circuit board (PCB) comprising a computing device, a mini-computer, a main-frame computer, a microcomputer, a telephonic computing device, a wired/wireless computing device (e.g., a smart-phone, a personal digital assistant (PDA)), a laptop, a tablet, a smart device, or any other similar functioning device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other pro-grammable logic device, discrete gate or transistor logic, discrete hardware components, or any combination thereof designed to perform the functions described herein. A gen-eral purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, and the com-munication interface 170).

The device 100 may further comprise the memory 130. In some embodiments, the memory 130 may comprise a ran-dom access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory com-puter-readable medium, along with a corresponding drive.

The device 100 may further comprise the input compo-nent 150. The input component 150 may include one or more components that permit the device 100 to receive informa-tion, such as via user input (e.g., a touch screen, a keyboard, a keypad, a mouse, a stylus, a button, a switch, a micro-phone, a camera, and the like). Alternatively or additionally, the input component 150 may include a sensor for sensing information (e.g., a global positioning system (GPS) com-ponent, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication inter-face 170 may enable the device 100 to establish connections and/or transfer communications with other devices (e.g., a server, another device). The communications may be effected via a wired connection, a wireless connection, or a combination of wired and wireless connections. The com-munication interface 170 may permit the device 100 to receive information from another device and/or provide information to another device. In some embodiments, the communication interface 170 may provide for communica-tions with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communica-tions with another device via a device-to-device (D2D) communication link, such as FlashLinQ, WiMedia, Blu-etooth, ZigBee, Wi-Fi, LTE, 5G, and the like. In other embodiments, the communication interface 170 may include an Ethernet interface, an optical interface, a coaxial inter-face, an infrared interface, a radio frequency (RF) interface, or the like.

The device 100 may be included in the core network 240 and perform one or more processes described herein. The device 100 may perform operations based on the processor 120 executing computer-readable instructions and/or code that may be stored by a non-transitory computer-readable medium, such as the memory 130 and/or the storage com-ponent 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively, or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
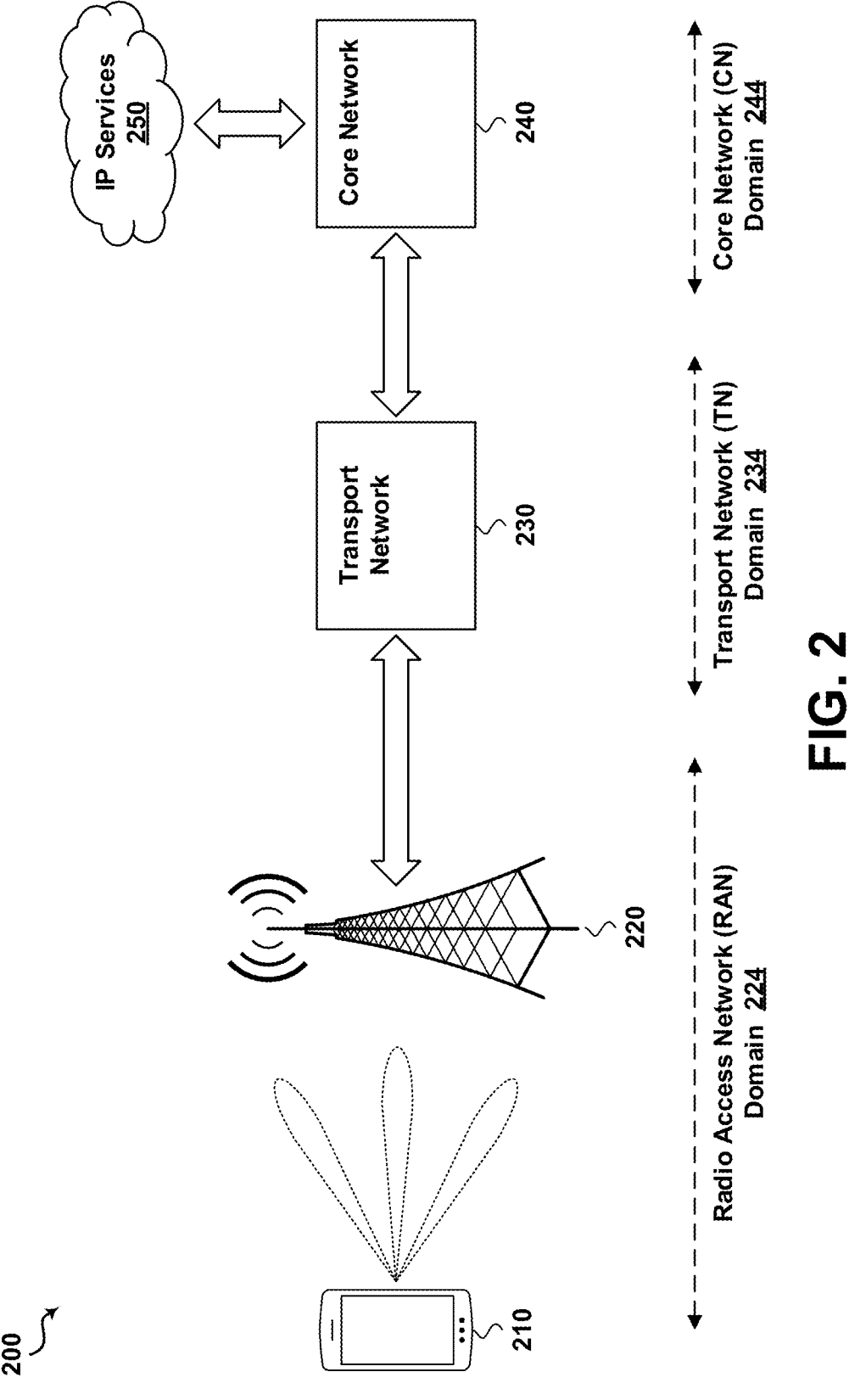
FIG. 2 is a schematic diagram of an example wireless communications system, in accordance with various embodiments of the present disclosure.

FIG. 2 is a diagram illustrating an example of a wireless communications system, according to various embodiments of the present disclosure. The wireless communications system 200 (which may also be referred to as a wireless wide area network (WWAN)) may include one or more user equipment (UE) 210, one or more base stations 220, at least one transport network 230, and at least one core network 240. The device 100 (FIG. 1) may be incorporated in the UE 210 or the base station 220.

The one or more UEs 210 may access the at least one core network 240 and/or IP services 250 via a connection to the one or more base stations 220 over a RAN domain 224 and through the at least one transport network 230. Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IoT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220 may wirelessly communicate with the one or more UEs 210 over the RAN domain 224. Each base station of the one or more base stations 220 may provide communication coverage to one or more UEs 210 located within a geographic coverage area of that base station 220. In some embodiments, as shown in FIG. 2, the base station 220 may transmit one or more beamformed signals to the one or more UEs 210 in one or more transmit directions. The one or more UEs 210 may receive the beamformed signals from the base station 220 in one or more receive directions. Alternatively or additionally, the one or more UEs 210 may transmit beamformed signals to the base station 220 in one or more transmit directions. The base station 220 may receive the beamformed signals from the one or more UEs 210 in one or more receive directions.

The one or more base stations 220 may include macrocells (e.g., high power cellular base stations) and/or small cells (e.g., low power cellular base stations). The small cells may include femtocells, picocells, and microcells. A base station 220, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

The one or more base stations 220 may be configured to interface (e.g., establish connections, transfer data, and the like) with the at least one core network 240 through at least one transport network 230. In addition to other functions, the one or more base stations 220 may perform one or more of the following functions: transfer of data received from the one or more UEs 210 (e.g., uplink data) to the at least one core network 240 via the at least one transport network 230, transfer of data received from the at least one core network 240 (e.g., downlink data) via the at least one transport network 230 to the one or more UEs 210.

The transport network 230 may transfer data (e.g., uplink data, downlink data) and/or signaling between the RAN domain 224 and the CN domain 244. For example, the transport network 230 may provide one or more backhaul links between the one or more base stations 220 and the at least one core network 240. The backhaul links may be wired or wireless.

The core network 240 may be configured to provide one or more services (e.g., enhanced mobile broadband (eMBB), ultra-reliable low-latency communications (URLLC), and massive machine type communications (mMTC), etc.) to the one or more UEs 210 connected to the RAN domain 224 via the TN domain 234. As an example, the core network 240 performs the translation service. Alternatively or additionally, the core network 240 may serve as an entry point for the IP services 250. The IP services 250 may include the Internet, an intranet, an IP multimedia subsystem (IMS), a streaming service (e.g., video, audio, gaming, etc.), and/or other IP services.

Figure 3:
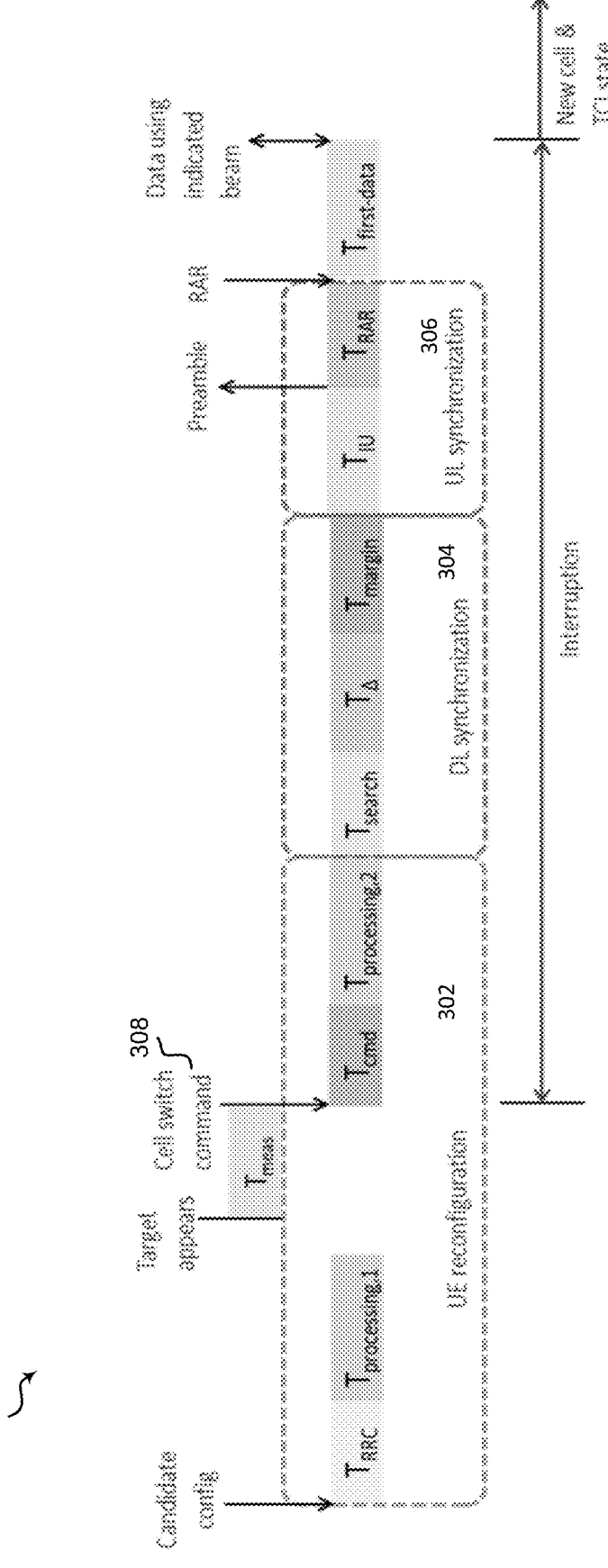
FIG. 3 illustrates agreed on components and times that impact connectivity interruption of a UE when switching to a new cell in the related art, in accordance with various embodiments of the present disclosure.

FIG. 3 illustrates an example timeline 300 of components and times that impact the connectivity interruption of a UE when switching to a new cell. As illustrated in FIG. 3, after a cell switch command 308, the UE needs to perform DL 304 and UL 306 synchronization. In addition to this synchronization, there is processing delay. The processing delay may include part of the UE reconfiguration 302 procedure.

Mobility (e.g., handover) latency may be advantageously reduced by using an AI/ML model based channel prediction. The UE or the network may predict a measured metric (e.g., the RSRP of a reference signal), and if certain conditions hold, the UE may be indicated to switch to the target cell at a later time. In the time interval between the switch command is received and applied, the UE may prepare for cell switch including performing UE reconfiguration, DL synchronization, and UL synchronization. For example, if a cell switch command is predicted at a future slot k, the UE reconfiguration 302, DL synchronization 304, and UL synchronization 306 may be performed before the cell switch command at slot k.

Figure 4:
FIG. 4 illustrates an inter-cell mobility scenario, in accordance with various embodiments of the present disclosure.

FIG. 4 illustrates an example wireless communication network 400 with cells Cell-1, Cell-2, and Cell-3. The UE 402 may be configured with a set of neighbor cells (candidate target cells) to measure. In some embodiments, the UE may be configured with the measurement configuration containing configurations of the SSB and/or CSI-RS resources, physical cell IDs, etc. The UE may also be configured with the measurement reporting configurations. Reporting configurations may include, for example, periodic and aperiodic reporting. For example, for the UE 402 in FIG. 4, Cell-1 may be the serving cell, and the UE may be configured to measure the signal quality of Cell-1, and neighbor cells Cell-2 and Cell-3.

The UE may perform the measurements while connected to the serving cell. For inter-frequency measurements, the UE may be configured with measurement gaps, during which UE can perform measurement of other cells. For example, the UE may perform measurements at periodic intervals.

The following examples refer to a serving and a target cell. However, the examples are not limited to this configuration and may accommodate more than one target cell. The target cell may belong to the same DU as the serving cell or a different DU. The methods are applicable to more than one target cell.

In some examples, an AI/ML model may be used to predict a channel or a metric of a channel, a reference signal, or a metric of a reference signal. For example, an AI/ML model may be used to predict the channel impulse response. In another example, an AI/ML model may be used to predict a metric of a reference signal, for example, the RSRP of a reference signal. A first set of reference signals such as a set of SSBs or a set of CSI-RS resources may be used as an input to the AI/ML model. A reference signal may be subject to beamforming. As an example, the gNB may transmit 64 SSBs in slot (n), where each SSB may be transmitted with a different beam (e.g., a different beamforming vector may be applied to an SSB). The UE may measure the RSRP of the SSBs and using the RSRP measurements as an input to an AI/ML model, the UE may infer the RSRP of all or a subset of the SSBs in slot (n+k). Each of n and k may be positive integers. As such, slot (n+k) occurs at a later time than slot n. A reference signal or a channel may be associated with a TCI (Transmission Configuration Indication) state. The RS/channel that is associated with a specific TCI state may be assumed to be transmitted with the same beam as the reference signal (SSB or CSI-RS) associated to the TCI state.

According to some embodiments, the UE may have a plurality of AI/ML models. A first AI/ML model may be used to predict a metric for the serving cell and a second AI/ML model may be used to predict a metric for the target cell. For example, AI/ML models may be used to predict the RSRP and/or RSRQ of a set of SSBs (e.g., the set may be all SSBs or the SSBs with the highest RSRP and/or RSRQ). If the AI/ML model inference takes place at the network (e.g., the gNB), the UE may report the reference signal measurements (e.g., RSRP) to the network and the inference (e.g., prediction) may be performed at the network side. In some examples, the first and second models are the same model.

According to some embodiments, the model used to infer a metric for the target cell may be transferred from the serving cell to the UE if the inference is performed at the UE. If the inference is performed at the network side, the model may be transferred from the target cell to the serving cell.

If the inference is performed at the UE side, the UE may report the inferred values to the serving cell. The reporting configuration (e.g., reporting periodicity, resources to use for the report, etc.) may be performed by the network (e.g., using RRC). Furthermore, if the inference is performed at the UE side, the UE may trigger a measurement report if a certain event happens. For example, if the inference is performed in time t and the metric is RSRP, some of the events include, but are not limited to: (i) the target cell RSRP may be predicted to become better than a threshold in time t+T; (ii) the target cell RSRP may be predicted to become better than a threshold+offset in time t+T; (iii) the serving cell RSRP may be predicted to be worse than a first threshold and the target cell RSRP may be predicted to be better than a second threshold, etc. The events may be predicted within a time interval.

If the inference is performed at the network side, the UE may report the serving cell and target cell measurements (e.g., RSRP of SSBs from both cells) to the network, and the network may infer (e.g., predict) the corresponding RSRP values.

Based on the inference result, the network may indicate to the UE to switch to the target cell. The indication may have the target cell ID and the TCI state (e.g., beam) to use after switch.

The cell switch command may be applicable at a time later than the time the command is received. For example, if the command is received at time t, the UE may be expected to switch to the target cell at time t+T. The unit of time may be ms, slots, etc. The duration T may be included in the cell switch command.

In some examples, the UE and/or the network may determine, before the switch is scheduled to occur, that the inferred values may not have been predicted with sufficient accuracy. When it is determined that inferred values are not predicted with sufficient accuracy, the network may send a cancellation indication to the UE. For example, the inferred values may be compared with one or more reference values, and if the difference between the inferred values and the one or more reference values is greater than a threshold, the inferred values may be determined to be inaccurate.

The cancellation message may carry the target cell ID. The switch and cancellation messages may have the same format (e.g., they may be the same MAC CE), and one bit in the message (MAC CE) may indicate the type of the message (e.g., 1 is for switch and 0 is for cancel switch). In some examples, after the switch command, the UE may determine that the target cell is not a viable candidate anymore and send a request-cancel-switch MAC CE to the network.

In some examples, an AI/ML model may be used for neighbor cell measurement relaxation. For example, the UE or the network may infer a quality metric of the serving cell. If the metric is expected to stay above a threshold for at least a duration of T seconds, then the serving cell may indicate to the UE to relax measurement of the neighbor cells. Relaxation may refer to the UE measuring the neighbor cells with a higher periodicity. In other examples, neighbor or cell measurement may be activated and/or deactivated.

When the current serving cell has a beam quality (e.g., signal strength, history of the signal strength, or the result of stability estimation based on an AI/ML model calculation) that is better than a configured threshold, the UE may reduce, or the network may configure the UE to reduce, the frequency of the neighbor beam measurement, resulting in a reduction of power consumption by the UE. This decision may be made based on the AI/ML model output of, for example, an estimated duration within which the signal strength of the camping beam is larger than a threshold and/or a probability of that scenario occurring, which may be derived by calculated accuracy information by model monitoring.

FIG. 5 illustrates a flowchart of an embodiment of a process 500 for predicting a cell switch. The process 500 may be performed by a UE such as UE 402 (FIG. 4) that is in communication with a serving cell Cell-1, and cells Cell-2 and Cell-3 may be target cells. The process 500 may start at operation S502, where the UE receives, from a target cell in a wireless communication network, a set of resources for a slot n. For example, the UE may receive resources from Cell-2 and Cell-3.

The process proceeds to operation S504, where the UE measures, for the target cell, a network quality parameter based on the set of resources. The set of resources may include a plurality of reference signals, where the network quality parameter may be a RSRP of each reference signal.

The process proceeds to operation S506, where the UE reports, to the serving cell, results corresponding to the measuring of the network quality parameter. In some examples, an AI/ML model may be included at the UE, and the results corresponding to the measuring the network quality parameter include a prediction of the AI/ML model. In other examples, the AI/ML model is included on the network side (e.g., base station) and the results corresponding to the measuring of the network quality parameter includes the measurements performed by the UE.

The process proceeds to operation S508 where the UE receives, based on (i) the prediction from an AI/ML model using the measuring of a network quality parameter as input into the AI/ML model and (ii) a determination that a cell switching condition is satisfied, a command to switch from the serving cell to the target cell at a time correspond to slot n+k. The parameters n and k may be positive integers. In some examples, the cell switching condition specifies that the AI/ML model predicts that at the time corresponding to slot n+k, the target cell has a RSRP that is greater than a threshold. In some examples, the cell switching condition specifies that the AI/ML model predicts that at the time corresponding to slot n+k, the serving cell has a RSRP that is less than a first threshold and the target cell has a RSRP that is greater than a second threshold.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method performed by at least one processor of a user equipment (UE) having a connection with a serving cell in a wireless communication network, the method including: receiving, from a target cell in the wireless communication network, a set of resources for a slot n; measuring, for the target cell, a network quality parameter based on the set of resources; reporting, to the serving cell, results corresponding to the measuring of the network quality parameter; and receiving, based on (i) a prediction from an artificial intelligence machine learning (AI/ML) model using the measuring of the network quality parameter as an input into the AI/ML model and (ii) a determination that a cell switching condition is satisfied, a command to switch from the serving cell to the target cell at a time corresponding to slot n+k, in which n and k are integers greater than zero.

(2) The method according to feature (1), in which the set of resources include a plurality of reference signals, and in which the network quality parameter is a reference signal resource power (RSRP) of each reference signal.

(3) The method of feature (2), in which the cell switching condition specifies that the AI/ML model predicts that at the time corresponding to slot n+k, the target cell has a RSRP that is greater than a threshold.

(4) The method of feature (2), in which the cell switching condition specifies that the AI/ML model predicts that at the time corresponding to slot n+k, the serving cell has a RSRP that is less than a first threshold and the target cell has a RSRP that is greater than a second threshold.

(5) The method according to feature (1), in which the network quality parameter is a channel impulse response (CIR).

(6) The method according to feature (1), in which the AI/ML model is located at the UE, and the reporting the results corresponding to the measuring of the network quality parameter includes the prediction.

(7) The method according to feature (6), in which the UE receives the AI/ML model from the serving cell.

(8) The method according to feature (1), in which the AI/ML model is located at a base station of the serving cell, and in which the base station of the serving cell receives the AI/ML model from the target cell.

(9) The method of feature (1), further including: after receiving the command to switch from the serving cell to the target cell, performing downlink synchronization and uplink synchronization with the target cell before the time corresponding to slot n+k lapses.

(10) The method of feature (1), further including: after receiving the command to switch from the serving cell to the target cell, transmitting a request to the serving cell to cancel the switch based on a determination a condition for switching from the serving cell to the target cell is no longer valid.

(11) The method of feature (1), further including: increasing a periodicity of measuring one or more neighboring cells based on a determination the AI/ML model predicts that a network quality parameter for the serving cell will stay above a threshold for a predetermined time period.

(12) A user equipment (UE) having a connection with a serving cell in a wireless communication network, the UE including: at least one memory configured to store computer program code; and at least one processor configured to access said at least one memory and operate as instructed by the computer program code, the computer program code including: first receiving code configured to cause at least one of said at least one processor to receive, from a target cell in the wireless communication network, a set of resources for a slot n, measuring code configured to cause at least one of said at least one processor to measure, for the target cell, a network quality parameter based on the set of resources, reporting code configured to cause at least one of said at least one processor to report, to the serving cell, results corresponding to the measuring of the network quality parameter, and second receiving code configured to cause at least one of said at least one processor to receive, based on (i) a prediction from an artificial intelligence machine learning (AI/ML) model using the measuring of the network quality parameter as an input into the AI/ML model and (ii) a determination that a cell switching condition is satisfied, a command to switch from the serving cell to the target cell at a time corresponding to slot n+k, in which n and k are integers greater than zero.

(13) The UE according to feature (12), in which the set of resources include a plurality of reference signals, and in which the network quality parameter is a reference signal resource power (RSRP) of each reference signal.

(14) The UE of feature (13), in which the cell switching condition specifies that the AI/ML model predicts that at the time corresponding to slot n+k, the target cell has a RSRP that is greater than a threshold.

(15) The UE of feature (13), in which the cell switching condition specifies that the AI/ML model predicts that at the time corresponding to slot n+k, the serving cell has a RSRP that is less than a first threshold and the target cell has a RSRP that is greater than a second threshold.

(16) The UE according to feature (12), in which the network quality parameter is a channel impulse response (CIR).

(17) The UE according to feature (12), in which the AI/ML model is located at the UE, and in which the reported results corresponding to the measuring of the network quality parameter includes the prediction.

(18) The UE according to feature (17), in which the UE receives the AI/ML model from the serving cell.

(19) The UE according to feature (12), in which the AI/ML model is located at a base station of the serving cell, and in which the base station of the serving cell receives the AI/ML model from the target cell.

(20) A non-transitory computer readable medium having instructions stored therein, which when executed by a processor in a user equipment (UE) having a connection with a serving cell in a wireless communication network, cause the processor to execute a method including: receiving, from a target cell in the wireless communication network, a set of resources for a slot n; measuring, for the target cell, a network quality parameter based on the set of resources; reporting, to the serving cell, results corresponding to the measuring of the network quality parameter; and receiving, based on (i) a prediction from an artificial intelligence machine learning (AI/ML) model using the measuring of the network quality parameter as an input into the AI/ML model and (ii) a determination that a cell switching condition is satisfied, a command to switch from the serving cell to the target cell at a time corresponding to slot n+k, in which n and k are integers greater than zero.

What is claimed:

1. A method performed by at least one processor of a user equipment (UE) having a connection with a serving cell in a wireless communication network, the method comprising:
receiving, from a target cell in the wireless communication network, a set of resources for a slot n;
measuring, for the target cell, a network quality parameter based on the set of resources;
reporting, to the serving cell, results corresponding to the measuring of the network quality parameter; and
receiving, based on (i) a prediction from an artificial intelligence machine learning (AI/ML) model using the measuring of the network quality parameter as an input into the AI/ML model and (ii) a determination that a cell switching condition is satisfied, a command to switch from the serving cell to the target cell at a time corresponding to slot n+k,
wherein n and k are integers greater than zero,
wherein the prediction from the AI/ML model is a predicted network quality parameter of the target cell at slot n+k, and
wherein the network quality parameter is a channel impulse response (CIR).

2. The method according to claim 1, wherein the set of resources include a plurality of reference signals, and wherein the network quality parameter is a reference signal resource power (RSRP) of each reference signal.

3. The method of claim 2, wherein the cell switching condition specifies that the AI/ML model predicts that at the time corresponding to slot n+k, the target cell has a RSRP that is greater than a threshold.

4. The method of claim 2, wherein the cell switching condition specifies that the AI/ML model predicts that at the time corresponding to slot n+k, the serving cell has a RSRP that is less than a first threshold and the target cell has a RSRP that is greater than a second threshold.

5. The method according to claim 1, wherein the AI/ML model is located at the UE, and the reporting the results corresponding to the measuring of the network quality parameter includes the prediction.

6. The method according to claim 5, wherein the UE receives the AI/ML model from the serving cell.

7. The method according to claim 1, wherein the AI/ML model is located at a base station of the serving cell, and wherein the base station of the serving cell receives the AI/ML model from the target cell.

8. The method of claim 1, further comprising:
after receiving the command to switch from the serving cell to the target cell, performing downlink synchronization and uplink synchronization with the target cell before the time corresponding to slot n+k lapses.

9. The method of claim 1, further comprising:
after receiving the command to switch from the serving cell to the target cell, transmitting a request to the serving cell to cancel the switch based on a determination a condition for switching from the serving cell to the target cell is no longer valid.

10. The method of claim 1, further comprising:
increasing a periodicity of measuring one or more neighboring cells based on a determination the AI/ML model predicts that a network quality parameter for the serving cell will stay above a threshold for a predetermined time period.

11. A user equipment (UE) having a connection with a serving cell in a wireless communication network, the UE comprising:
at least one memory configured to store computer program code; and
at least one processor configured to access said at least one memory and operate as instructed by the computer program code, the computer program code including:
first receiving code configured to cause at least one of said at least one processor to receive, from a target cell in the wireless communication network, a set of resources for a slot n,
measuring code configured to cause at least one of said at least one processor to measure, for the target cell, a network quality parameter based on the set of resources,
reporting code configured to cause at least one of said at least one processor to report, to the serving cell, results corresponding to the measuring of the network quality parameter, and second receiving code configured to cause at least one of said at least one processor to receive, based on (i) a prediction from an artificial intelligence machine learning (AI/ML) model using the measuring of the network quality parameter as an input into the AI/ML model and (ii) a determination that a cell switching condition is satisfied, a command to switch from the serving cell to the target cell at a time corresponding to slot n+k, wherein n and k are integers greater than zero, wherein the prediction from the AI/ML model is a predicted network quality parameter of the target cell at slot n+k, and wherein the network quality parameter is a channel impulse response (CIR).

12. The UE according to claim 11, wherein the set of resources include a plurality of reference signals, and wherein the network quality parameter is a reference signal resource power (RSRP) of each reference signal.

13. The UE of claim 12, wherein the cell switching condition specifies that the AI/ML model predicts that at the time corresponding to slot n+k, the target cell has a RSRP that is greater than a threshold.

14. The UE of claim 12, wherein the cell switching condition specifies that the AI/ML model predicts that at the time corresponding to slot n+k, the serving cell has a RSRP that is less than a first threshold and the target cell has a RSRP that is greater than a second threshold.

15. The UE according to claim 11, wherein the AI/ML model is located at the UE, and wherein the reported results corresponding to the measuring of the network quality parameter includes the prediction.

16. The UE according to claim 15, wherein the UE receives the AI/ML model from the serving cell.

17. The UE according to claim 11, wherein the AI/ML model is located at a base station of the serving cell, and wherein the base station of the serving cell receives the AI/ML model from the target cell.

18. A non-transitory computer readable medium having instructions stored therein, which when executed by a processor in a user equipment (UE) having a connection with a serving cell in a wireless communication network, cause the processor to execute a method comprising:

receiving, from a target cell in the wireless communication network, a set of resources for a slot n;

measuring, for the target cell, a network quality parameter based on the set of resources;

reporting, to the serving cell, results corresponding to the measuring of the network quality parameter; and receiving, based on (i) a prediction from an artificial intelligence machine learning (AI/ML) model using the measuring of the network quality parameter as an input into the AI/ML model and (ii) a determination that a cell switching condition is satisfied, a command to switch from the serving cell to the target cell at a time corresponding to slot n+k, wherein n and k are integers greater than zero, wherein the prediction from the AI/ML model is a predicted network quality parameter of the target cell at slot n+k, and wherein the network quality parameter is a channel impulse response (CIR).

* * * * *